Aug. 26, 1924.

M. C. SCHWEINERT 1,506,029

TIRE VALVE REPAIR TOOL

Filed Nov. 10, 1921

Inventor:
Maximilian Charles Schweinert,
By Attorneys,
Fraser Tuck Myers

Patented Aug. 26, 1924.

1,506,029

UNITED STATES PATENT OFFICE.

MAXIMILIAN CHARLES SCHWEINERT, OF NEW YORK, N. Y.

TIRE-VALVE REPAIR TOOL.

Application filed November 10, 1921. Serial No. 514,254.

*To all whom it may concern:*

Be it known that I, MAXIMILIAN CHARLES SCHWEINERT, a citizen of the United States of America, residing in the borough of Manhattan, city, county, and State of New York, have invented certain new and useful Improvements in Tire-Valve Repair Tools, of which the following is a specification.

The present invention relates to tire-valve repair tools and aims to provide certain improvements therein.

In devices of this class heretofore proposed, it has always been sought to provide a tool having several instrumentalities, and one which would be sturdy, serviceable, and take up very little room in a tool kit. Devices of this kind have been more or less practicable, but in most instances have failed to bring into one compact tool a sufficient number of instrumentalities whereby any desired repair to the tire valve or its casing could be made.

According to the present invention, I have brought into assembled cooperation a series of instrumentalities whereby practically any repair desired can be made to a tire valve. By the present invention I have incorporated into a single tool as many as eight separate instrumentalities. Briefly, the present device provides a handy tool which is practicable for the uses intended therefor, and one which is simple in construction and may therefore be manufactured and sold at a low price. The instrumentalities contemplated by the present device may be enumerated as follows: a screw-driver for extracting the valve insides; a tap for re-threading the internal threads of a valve casing; a die for re-threading the external threads of a valve casing nipple; a cutter for dressing the top seating face of such nipple; a tire valve deflator; a tire valve extractor for use when the screw-driver projections on the valve plug become inoperative or when said plug becomes separated from the valve seat member; a valve pin or spring extractor; and a tap for re-threading the internal threads on a valve cap or pump coupling so that said elements may readily engage the threads on the valve nipple. The invention also embodies other features of improvement which will be hereinafter more fully set forth, In the accompanying drawings, wherein the preferred embodiment of my invention is disclosed,—

Figure 1:
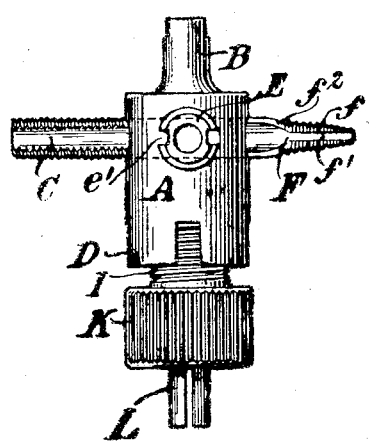
Figure 1 shows a side elevation of the device.

Referring to the drawings, let A indicate the body portion of the device, which has associated with it the various instrumentalities of the present invention. These are designated in the drawings by the following reference characters: B is the screw-driver, C the tap for re-threading the internal threads of the valve casing, D the die, E the tire valve deflator, F the tire valve extractor, L the valve pin or spring extractor, H the valve casing top cutter or dressing tool, and I the tap for repairing the internal threads on a valve cap or valve pump coupling. Of these instrumentalities, the body portion has the former five securely or integrally associated therewith, while the latter three are separably connected therewith.

The body portion A preferably consists of a cylindrical or polygonal member having the screw-driver device projecting from one end, and its opposite end provided with the die D by being hollowed out and screw-threaded, as shown at $a$, and longitudinally slitted, as shown at $a'$, whereby to provide cutting edges for said threads $a$. The screw-driver device B is herein shown as formed integrally with the metal of the body portion by being reduced in diameter and having said reduced end slotted, as indicated at $b$, and its interior hollowed out, as indicated at $b'$, to accommodate the valve pin when it is desired to remove the valve insides from the tire. This specific construction of the screw-driver device, however, may be varied without affecting the other elements of the tool.

In order to provide a handle for the screw-driver B and die D carried by the body portion, I prefer to employ an element which may also serve as instrumentalities of the tool. Accordingly, for this purpose I employ an element which extends transversely through the body portion, and carries at one end the tap C and at its other end the valve extractor F. This instrument-carrying handle is preferably formed of channeled stock, whereby in the formation of said tap it is merely necessary to cut a thread thereon. In the formation of the valve extractor on the opposite end of this handle said channeled stock is first tapered as shown at $f$, then provided with a longitudinal groove $f'$, and next provided with a left-hand tapered thread as indicated at $f^2$. The purpose of this tapered left-hand thread and longitudinal groove will be apparent when one considers the manner in which this instrumentality of the tool functions. As hereinbefore stated, the valve extractor is employed for withdrawing the valve plug or seat member when the screw-driver projections on said plug become inoperative, or when said plug becomes separated from the valve seat member from any cause. Hence, when it is sought to withdraw said valve insides when either of the conditions enumerated has made the withdrawal of the valve insides impossible by ordinary means, the valve pin is first extracted by the extractor L hereinafter to be more fully described, and the valve extractor F inserted into the central opening passing through the plug or valve seat. Upon turning the valve extractor in a left-hand or counter-clockwise direction, the tapered threads thereon will grip the wall of said opening and turn the plug or valve seat with it. By continuing this turning movement the plug, which has a right-hand thread, will unscrew from the casing, while in the case of extracting the valve seat member a sufficient binding action between the valve extractor and seat may be obtained to permit of said seat member being extracted by exerting an outward pull on the tool. The instrument-carrying handle is preferably force-fitted in the body portion so as to provide a secure union therewith. It will be appreciated from the location and arrangement of said tool-carrying handle and body portion that the body portion serves as a handle for the instrumentalities carried by the handle portion.

As it is desirous at times to deflate a tire preparatory to removing it from a wheel rim, the present tool also includes a tire deflator. As herein shown, this deflator E consists of an externally threaded lateral projection carried by the body portion and secured thereto in any desired manner. This projection is preferably formed with an enlarged base $e$ adapted to engage the top of the valve nipple when the screw-threads engage the interior thereof and depress the valve pin to open the valve, and the plug is also provided with grooves $e'$ extending longitudinally of the plug and passing through said base, whereby to provide an exit for the escaping air from the tire.

The device thus far described discloses five instrumentalities carried by and fixedly associated with the body portion. The remaining instrumentalities of this device are removably carried by the body portion and nest therewith to provide a compact device. As shown in the drawings, said instrumentalities are embodied in a hollow plug K consisting of an exteriorly threaded tubular portion $k$ and a somewhat enlarged finger-manipulating portion or flange $k'$. The exterior of this enlarged portion is preferably milled or nurled to increase the finger-gripping contact therewith. Positioned within this hollow plug, and adapted for a limited relative longitudinal movement therewith, is the split pin L, the adjacent faces of which are longitudinally grooved as indicated at $l$, and constituting a passage substantially therethrough. The prongs of this pin are normally expanded and adapted to be contracted by coöperating means on the pin and plug. These means, as herein disclosed, consist of a beveled shoulder $k^2$ on the interior of the plug and a correspondingly beveled external shoulder $l^2$ on the pin, which when forced against the former causes a contraction or closing of the prongs. While such contraction may be produced in various ways, I have elected to bring this about by having the top of the pin engage the body portion as the plug K is threaded into the body A. The pin and plug are held against separation when removed from the body portion by having the end $k^3$ of the plug engaging over the shoulder $l^3$ adjacent the top of the pin. The external diameter of the pin is made substantially smaller than the internal diameter of the valve casing into which it is positioned when it is desired to withdraw the valve pin or broken valve spring, and in view of the normal expanded condition of such pin it will be appreciated that the valve pin or spring may be readily engaged in the grooves of the prongs and clamped therein by screwing the plug into the body portion. When thus clamped it is merely necessary to exert an outward pull to withdraw said part.

Figure 2:
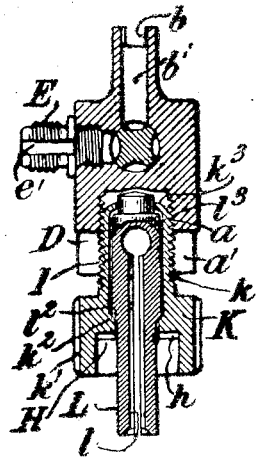
Fig. 2 is a longitudinal section thereof taken at right angles to Fig. 1.
Figure 4:
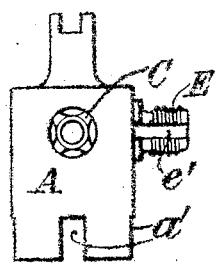
Fig. 4 is a side elevation of the body member taken at right angles to Fig. 1.
Figure 3:
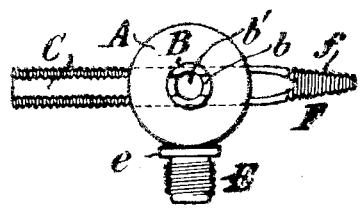
Fig. 3 is a top plan view of the device.
Figure 5:
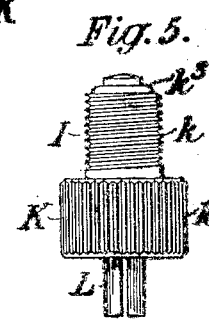
Fig. 5 is an elevation of the valve-pin extractor disconnected from the body member.
Figure 6:
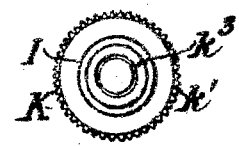
Figs. 6 and 7 are a top plan view and a bottom plan view, respectively, of the valve-pin extractor shown in Fig. 5.
Figure 7:
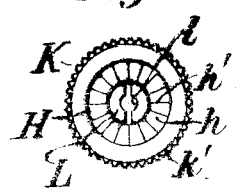
Figure 8:
Fig. 8 is a bottom plan view of Fig. 4.

The plug K, while primarily adapted to function in cooperation with the valve-pin extractor L, also possesses other instrumentalities. These include the valve-casing top cutter or dressing tool H and the valve cap or pump coupling tap I. The cutter H is preferably formed within the enlarged portion $k'$, wherein a shoulder $h$ is provided with cutting ridges $h'$, as best illustrated in Figs. 2 and 7. The external threads on the sleeve $k$ are adapted to function as a tap for the purpose described, when disconnected from the body portion and manipulated through the milled flange $k'$.

From the foregoing description it will be seen that I have provided a tire-valve repair tool having instrumentalities adapted to remedy defects in tire-valve constructions arising through use, and to remove broken or damaged valve insides when such is found to be necessary.

What I claim is:—

1. A tire-valve repair tool having a body portion comprising among other instrumentalities a die and a part carrying a valve-pin extractor, said part having a threaded portion engaging the threads of the die, and said threaded portion when removed from the die being adapted to serve as a tap to clear the internal threads on a valve cap or valve pump coupling.

2. A tire-valve repair tool having a body portion comprising among other instrumentalities a valve-pin extractor consisting of a hollow externally screw-threaded part adapted to screw into the body portion and enclosing a separately formed split pin with normally expanded prongs, and cooperating means on the pin and part for contracting the prongs.

3. A tire-valve repair tool having a body portion comprising among other instrumentalities a valve-pin extractor consisting of a hollow externally screw-threaded part adapted to screw into the body portion and enclosing a split pin with normally expanded prongs, which are adapted to be contracted when the head of the pin is forced against the body part.

4. A tire-valve repair tool comprising an instrument-carrying body portion and an instrument-carrying handle passing transversely therethrough, said handle being formed of channeled stock having a plurality of longitudinal channels and one end of said handle formed with a left-hand tapered screw-thread traversing said channels.

In witness whereof, I have hereunto signed my name.

MAXIMILIAN CHARLES SCHWEINERT.